May 16, 1939.   E. A. VIEROW   2,158,095
REGENERATIVE FURNACE
Filed March 17, 1936   2 Sheets-Sheet 1
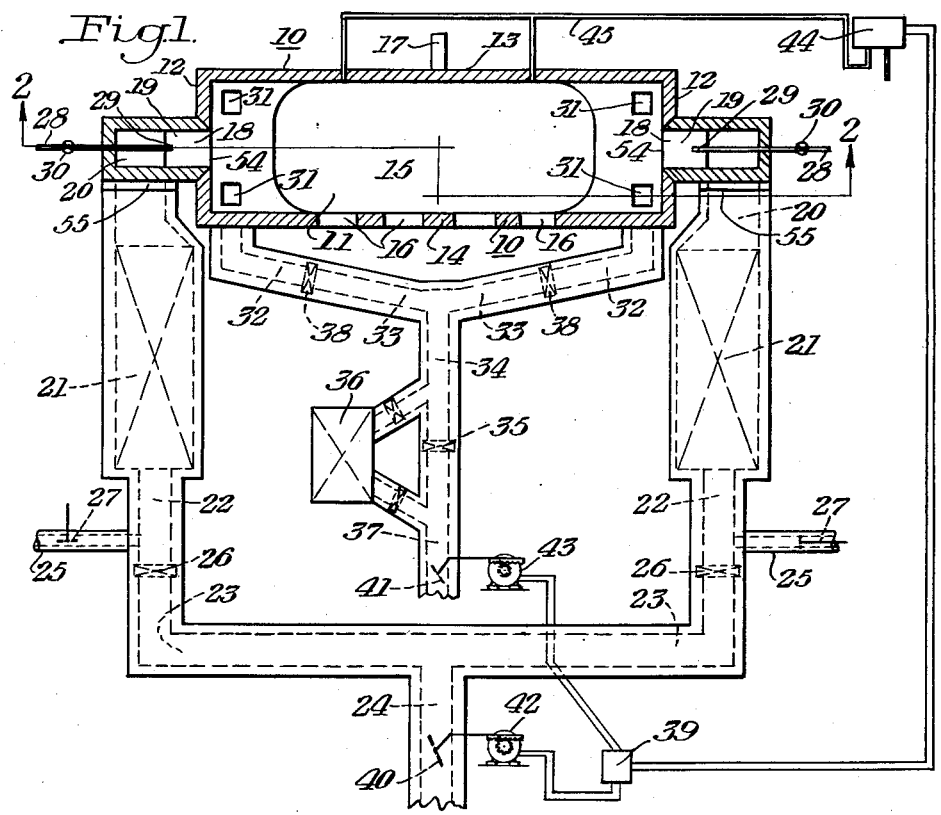
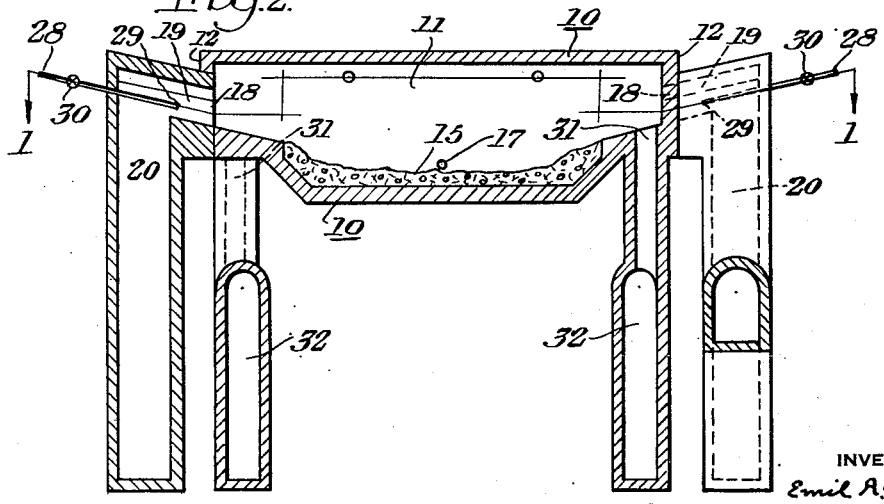
INVENTOR
Emil A. Vierow
by Edward A. Laurence,
his attorney.

May 16, 1939.     E. A. VIEROW     2,158,095
REGENERATIVE FURNACE
Filed March 17, 1936     2 Sheets-Sheet 2
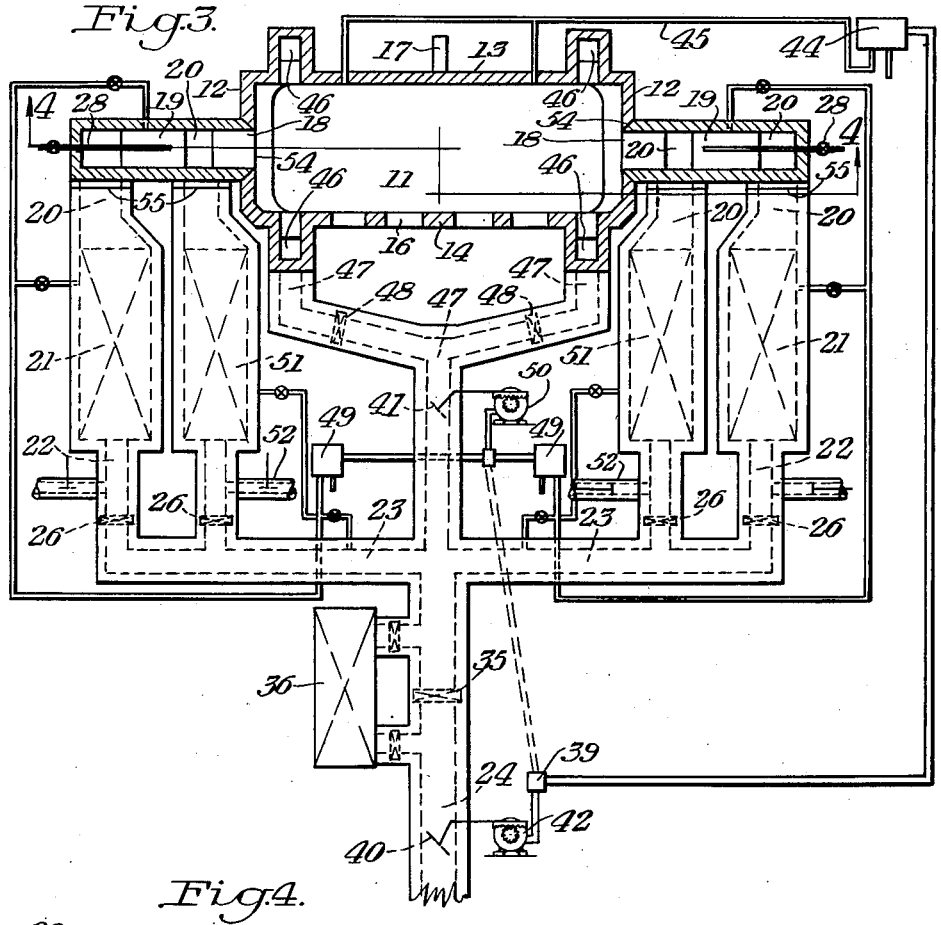
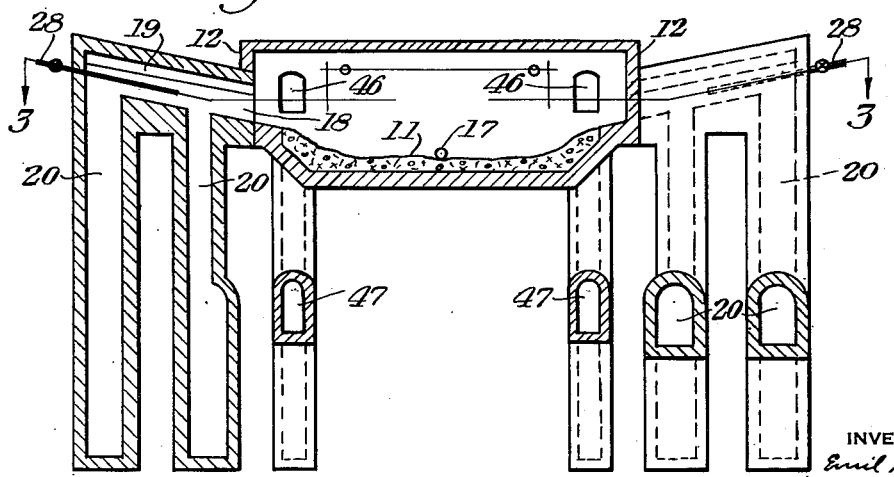
INVENTOR Patented May 16, 1939

2,158,095

UNITED STATES PATENT OFFICE 2,158,095

REGENERATIVE FURNACE

Emil A. Vierow, Pittsburgh, Pa.

Application March 17, 1936, Serial No. 69,322.

14 Claims. (Cl. 263—15)

My invention relates generally to regenerative furnaces and more particularly to new and improved methods and apparatus for the operation of regenerative furnaces.

This invention may be conveniently applied to all types of regenerative furnaces but it is particularly adaptable to the open hearth type of regenerative furnace.

A simple regenerative furnace is provided with two regenerative units, the ports of which open into the furnace chamber at opposite ends thereof with the charge to be heated being centrally disposed therebetween and in the direct line of fire from the ports. In a given period of time a regenerative unit on one end of the furnace will fire while the regenerative unit on the other end is conducting the products of combustion away from the furnace. The operation of the regenerative units is then reversed for another period of time. These two periods of time make up what is known in the art as a cycle of operation of the furnace.

In a regenerative furnace having a complex structure wherein the furnace is provided with a plurality of regenerative units at each of its ends or sides, the cycle of operation is made up in accordance with the rotation of the firing periods among these units, whether it be firing from end to end in alternate fashion or firing and discharging from both ends at the same time.

The kind of fuel used in firing regenerative furnaces may vary for different types and uses of the furnace. Gas, tar and oil are the most desirable kinds of fuel used. It may be fed directly into the furnace chamber associated with or separately from the regenerative units serving preheated air. A gaseous fuel may be preheated in a regenerative unit separate from the regenerative unit producing preheated air and they may be mixed prior to entering the furnace chamber or separately fed thereinto. It is sometimes practical to alternately fire preheated air and preheated fuel through the same regenerative unit.

My method of operating a regenerative furnace is applicable to any of these types of furnaces.

A regenerative unit comprises a port, a regenerating chamber, a flue, a source of air and/or fuel supply and the connecting passageways therebetween which may be controlled by valves. Thus a regenerative unit may function alternately in preheating air or fuel and in conducting the products of combustion from the furnace chamber from which it absorbs the heat that is given up during the firing period.

The amount of the heat in the products of combustion leaving the furnace chamber is far in excess of the amount of heat that can be economically recovered in the regenerative units. Accordingly, it has been proposed, that the present regenerative open hearth furnace be modified in construction to provide for a partial discharge of the products of combustion to a boiler or other means of heat recovery without passing through regenerative units. For this purpose one would employ what may be termed as an auxiliary outlet.

An auxiliary outlet comprises a port, a flue and connecting passageways therebetween which may be controlled by valves. These outlets may lead directly to a flue or include a pass through a waste heat boiler or other dissociated means of heat recovery, thereby applying some of the heat of the products of combustion to useful purposes.

The proposals of waste heat boilers and the like offer the utilization of waste heat as their chief advantage which may appear to be attractive from an economic viewpoint in the conservation of energy. However, the initial cost of such improvements, in addition to the complexity of the furnace and its operation, burdens the economic problem to such an extent that practical limitations prevent the application thereof.

Some of the limitations in present practice result in erratic metallurgical reactions in the charge, the loss of metal during furnace operation, and the retarding of furnace production.

The principal object of this invention is the provision of a method of furnace operation which increases the rate of production thereof.

Another object of this invention is the provision of a method for operating a regenerative furnace to produce a condition within the furnace chamber that is conducive to uniform metallurgical reactions of the charge without undue loss thereof by controlling the operation of the auxiliary outlets.

Another object is the provision of a method of furnace operation that materially prolongs the life thereof.

Another object is the provision of a new and improved arrangement of the ports in the furnace chamber.

These objects and advantages in the construction and operation of regenerative furnaces are obtainable by the control of the operation of the furnace ports and are directed to the economic production of a uniform product at a faster rate. The gain derived from the use of waste heat boilers or the like is a secondary advantage which is made economically possible and which has not heretofore been considered as being fully practical.

Other objects and advantages will appear hereinafter.

In the accompanying drawings wherein I have illustrated a practical embodiment of the principles of my invention, Fig. 1 is a diagrammatic plan view showing the arrangement of a simple regenerative furnace with parts in section and parts broken away.

Fig. 2 is a vertical section of the furnace chamber taken along the lines 2—2 of Fig. 1.

Fig. 3 is a view similar to Fig. 1 illustrating a modification of my invention.

Fig. 4 is a vertical section of the furnace chamber taken along the lines 4—4 of Fig. 3.

Referring to the drawings and more particularly to Figs. 1 and 2, 10 represents a simple open hearth regenerative furnace having a furnace chamber 11 enclosed by the end walls 12, the rear wall 13 and the front wall 14. 15 represents the hearth of the furnace arranged to hold the charge that is to be heated or heat-treated. The charge of this type of furnace is inserted through the openings 16 in the front wall 14, which may be provided with doors or closure members not shown. The rear wall 13 is provided with a tap 17 for drawing off the charge in its molten state.

The end walls 12 are provided with the regenerative unit ports 18 which are connected by the inwardly and downwardly passageways 19, and the passageways 20 to one end of the regenerating chambers 21. The other end of the regenerating chambers 21 is connected by the passageways 22 and 23 to the common passageway 24 and thence to a suitable discharge such as a stack or fan which is not shown.

The passageways 22 are connected to the forced air supply ducts 25 from whence air is conducted to the regenerating chamber where it absorbs heat and passes to the furnace as preheated air during the firing period of the regenerator so employed.

The passageways 22 are separated from the passageways 23 by the valves 26 which are ordinarily referred to in the art as the reversing valves. The air ducts 25 are provided with the valves or dampers 27 which regulate the flow or completely close off the ducts from the passageways 22. In practice the valves 26 and 27 will be closed alternately with respect to one another and with respect to the operating cycle periods of the furnace. Thus when one regenerative unit is firing the valve 26 associated therewith is closed and the corresponding valve 27 may be employed to regulate the flow of air, whereas the valve 26 of the other regenerative unit is open to permit the products of combustion from the furnace to pass through the regenerating chamber and out to the stack and its corresponding valve 27 is closed. These valves may be mechanically or electrically operated individually or from a master control which automatically reverses the regenerative furnace.

In the type of furnace shown in Figs. 1 and 2 the fuel is fed by the pipes 28 to the furnace which pass through the walls of and into the passageway 19. The ends of the fuel pipes may be provided with suitable nozzles 29 for directing the discharge of the fuel into the charge held by the hearth. The fuel is ordinarily supplied under pressure and the rate of flow may be regulated by the valve 30. This valve may be automatically regulated by other prevailing conditions in connection with the furnace, which will be discussed hereinafter. The fuel nozzles are adjustable longitudinally of the passageway 19 and they may be made to project through the port 18 into the furnace chamber. Such an adjustment is desirable for certain operating conditions of the furnace and for the purpose of producing flames of different character when employing this type of fuel feeder.

31 represents auxiliary outlet ports which, in Figs. 1 and 2, are shown opening into the furnace chamber from the apron floor inwardly of the end walls of the furnace. These ports are connected by the passageways 32 and 33 to the common passageway 34 which may be directed by the valve 35 to the heat recovery unit 36, such as a waste heat boiler, or to the passageway 37 which leads directly to the stack. It is preferable to have two ports 31. However one port at each end of the furnace chamber would suffice.

The passageways 32 are separated from the passageways 33 by means of the reversing valves 38 which are operated alternately in like manner to and in sequence with the valves 26 depending upon which end of the furnace is firing or exhausting the products of combustion.

40 and 41 represent damper valves in the common passageways 24 and 34 respectively for controlling the discharge of the products of combustion from the regenerative units and the auxiliary outlets to the flue or waste heat boiler, as the case may be. These valves are operated by the servo motors 42 and 43 respectively which are controlled from the regulator 44 that is operated by the pressure in the furnace chamber. The pressure in the furnace chamber is conducted to the regulator 44 by means of the conduit 45 which is provided with two entries into the furnace chamber to compensate for pressure variations from one end of the hearth 15 to the other. 39 represents a transfer control panel for selectively operating one or both of the servo motors 42 and 43.

Referring now to Figs. 3 and 4 wherein I have illustrated a modification of the auxiliary outlets, 46 represents the ports of the auxiliary outlets which open from the rear and front walls 13 and 14 into the furnace chamber inwardly of the end walls 12. These ports may also be arranged to open into the furnace chamber from the ceiling.

The ports 46 are connected by the passageways 47 to the pasageways 23 of the regenerative units. The passageways 47 are provided with the reversing valves 48 which perform the same function as the valves 38 shown in Figs. 1 and 2.

49 represent regulators for controlling the servo motors 50 which operate the damper valve 41 for controlling the rate of flow of the products of combustion through the auxiliary outlets during the discharge period. The regulators 49 are in turn controlled by the pressure within the passageways 20, the regenerating chambers 21 or the passageways 22 depending upon the prevailing conditions of the particular layout.

The damper valve 40 in the passageway 24 is controlled directly from the regulator 44. With this arrangement the furnace chamber pressures are responsive to the regulation of the damper valve 40 which controls the flow of the products of combustion from the regenerative units as well as from the auxiliary outlets.

I have also illustrated the regenerative units 51 with the fuel pass 52 that may be operated in conjunction with the regenerative units having the regenerating chambers 21. With this arrangement I may fire preheated air and preheated fuel from separate regenerative units on one end of the furnace chamber at one time and at the same time regulate auxiliary outlets in accordance with the pressures in both regenerative units.

In both instances I have shown the ports 18 and the passageways 19 and 20 of the regenerative units occupying the end walls of the furnace chamber. These parts of each regenerative unit may be lifted as a unit by a crane from the end wall 12 at the divisional lines 54 and 55 and replaced by a duplicate unit without materially interfering with the operation of the furnace. This arrangement has many advantages, such as maintaining accurate flame directing walls of the passageway 19 and permits the replacement and adjustment of the nozzles 29. It is quite natural that the ports 18 and the passageways 19 are the first to burn out because of the high temperature which they are subjected to.

The improvement in operating regenerative furnaces resides in maintaining a predetermined pressure condition within the furnace chamber and simultaneously within regenerative units. To accomplish this purpose products of combustion are withdrawn from the furnace chamber through regenerative units at a substantially constant rate and through auxiliary outlets at a variable rate to maintain the furnace pressure constant.

However, the furnace pressure is a variable with respect to the fuel required from the time the charge is loaded into the hearth until it is withdrawn therefrom and during the melting period the furnace requires a high fuel input, yet the regenerative units exhaust the products at a predetermined constant rate and the auxiliary outlets are required to assume a greater portion of the load in discharging the products of combustion from the furnace.

When the charge is melted the fuel requirements diminish and consequently the pressure within the furnace chamber and the discharge of the auxiliary outlets are decreased through the presusre regulator control of the servo motor 43 or 50 opening the damper 41. This action maintains the same predetermined constant discharge through the regenerative units.

During the refining period less fuel is required, which results in a decreased furnace pressure. The products of combustion are therefore less that that required to be exhausted through the regenerative units alone to provide their discharge at a constant rate. In this instance the auxiliary outlets are completely closed by the damper valve 41 and the pressure regulator control is automatically switched to the servo motor 42 which may be regulated to retard the flow of the products of combustion from the regenerative units, thereby maintaining the pressure in the furnace chamber.

To effect the desired pressure condition in the furnace chamber when the auxiliary outlet damper valve is in its shut-off or limit position the draft regulating damper of the regenerative units may be set to handle all the products of combustion resulting from the burning of a given amount of fuel. When the fuel burning rate increases, the furnace pressure regulator acts to maintain the desired pressure condition in the furnace chamber by controlling the auxiliary outlet damper valve. Consequently all the products of combustion above the said given amount automatically pass from the furnace chamber through the auxiliary outlets. If only one pressure regulator is used it may be automatically switched to control either of the damper valves in accordance with the furnace conditions.

However when the fuel rate diminishes and the discharge of the products of combustion through the regenerative units is lower than the given amount that they are set to handle, the pressure in the furnace chamber may not be maintained at the desired amount. In this instance the auxiliary outlet damper valve has reached its shut-off or closing limit position. The pressure regulator is then automatically switched to control the servo motor for operating the damper valve of the regenerative units to maintain the desired pressure condition within the furnace chamber.

The operation of the regenerative furnace arrangement shown in Figs. 3 and 4 is similar to that previously described. The damper valve 41 which controls the flow of the products of combustion through the auxiliary outlets is operated by the servo motor 50 and controlled by the pressure regulators 49 which are actuated by the pressure within the regenerative units. Thus the auxiliary outlets, which may be looked upon as by-passes, are regulated to maintain a predetermined constant pressure within the discharging regenerative units. The total discharge from the furnace is regulated by the damper valve 46 which is operated by the servo motor 42 and the regulator 44 actuated by the furnace pressure. This in turn maintains a constant pressure within the furnace chamber.

In open hearth furnaces using my method of operation, the products of combustion are withdrawn from the furnace chamber through regenerative units at a substantially constant rate for a part of the furnace operating cycle and at a more nearly constant rate as compared with present practice for the remainder of the furnace operating cycle. Therefore the regenerative units may be designed to handle a smaller and more nearly constant flow of products of combustion at a maximum economic velocity.

It is therefore apparent that, in their alternate function of firing the furnace chamber, the regenerative unit ports produce a relatively higher port velocity in my method of operation. Thus with the construction described in Figs. 1–4 a highly desired blow-pipe burner action results and an increased flow of fuel and air is possible during the melt-down period without sacrificing flame control during the refining period when the flow is at a minimum.

In fact, for equal fuel rates, a considerable increase in port velocity is obtainable during a period when the flow is at a minimum with my method of operation as compared to the present conventional practice and this results in a well guided flame "hugging" to the bath during the refining period of the furnace operation which is known to speed up metallurgical operations.

Therefore with my new and improved construction and operation it is possible to increase the production of steel or other materials to be so manufactured.

The practical realization of an increased rate of steel production however, depends ultimately on furnace construction. Therefore to make positive the successful application of the described methods of furnace operation the port arrangement in the furnace chamber had to undergo drastic changes from that which is generally known and practiced in the art. This accounts for the arrangement of placing the auxiliary ports 31 in the floor of the furnace chamber and inwardly of the walls 12. They are out of the path of the gases leading to and from regenerator ports which operate continuously. They are in the floor which can be protected by placing refractories thereover.

The auxiliary outlet ports as shown in Figs. 1 to 4 are not subjected to the direct impingement of hot and dust-laden gases flowing in the furnace chamber and the velocity of the furnace gases are reduced before they reach the combined fuel and air ports of the regenerative units. Therefore, said regenerative unit ports and the auxiliary outlet ports are not subjected to excessive wear and tear. This is important, not only from a direct economy standpoint, but because the efficient operation of the furnace depends largely upon the continued functioning of the ports of the regenerative units.

Furthermore the auxiliary outlet ports are not integral with the port construction of regenerative units. In this manner the different ports are only subjected to the action of the furnace gases on their inner surface. Although the maintenance with the improved construction is decreased, when repairs are necessary they can be made to the different ports without any appreciable interference to furnace operation.

Again, the combined fuel and air ports of the regenerative units monopolize the furnace ends, the auxiliary outlet ports being inwardly disposed therefrom, and inasmuch as the main flow of products of combustion from the furnace chamber is through the regenerative units, the stream of flow of gases within the furnace toward the outlet end is always substantially central with respect to the furnace chamber. The firing is likewise central with respect to the furnace chamber. This makes for an increased life of the furnace chamber, because it lessens the rubbing action of the hot and dust-laden gases against the walls.

In addition to the increased rate of production that results from the application of the proposed construction and operation to open hearth furnaces many other important advantages are apparent, such as the increased speed in melting the charge is attended by less oxidation of the metal and a greater yield of product results. The use of a well guided flame "hugging" the bath is productive of more uniform metallurgical reactions throughout the bath and bring an improvement in the quality of product.

The availability of higher regenerative unit port firing velocities permits proper flame guidance and greatly reduces the possibilities of flame impingement on the furnace roof and front and backwalls, adding materially to the life of these parts.

The combined fuel and air ports of the regenerative units being restricted as to position more than in the present conventional practice, the control of combustion is improved. With combustion complete within the furnace chamber, the ports, passages, and regenerators are not subjected to the extremely destructive action of burning gases.

The blulkheads and downtakes of the regenerative units can be thoroughly insulated without fear of damage from burning out, because the incoming air has a greater cooling effect than in present conventional practice.

The use of my construction and operation likewise gives greatly increased regenerating chamber checker life and better regenerating chamber operation.

The advantages of my method of operating a regenerative furnace may be obtained in lesser degree in certain conventional regenerative furnaces with the use of auxiliary outlets in other constructions.

While regenerative open hearth furnaces have been shown and described, it will be understood that my invention is applicable to furnaces generally within the scope of the appended claims.

I claim:

1. The method of controlling the pressure within a regenerative furnace which comprises discharging the products of combustion from the furnace chamber at a substantially predetermined rate through a regenerative unit by regulating the furnace discharge through an auxiliary outlet.

2. The method of operating a regenerative furnace which comprises discharging the products of combustion from the furnace chamber at a substantially predetermined rate through a regenerative unit by regulating the furnace discharge through an auxiliary outlet and producing a constant pressure within the furnace chamber by regulating the total discharge from the regenerative unit and the auxiliary outlet.

3. In a regenerative furnace having means comprising a furnace chamber and a regenerative unit, the combination of an auxiliary outlet, and means actuated by the pressure in the first mentioned means for controlling the flow of the products of combustion through the auxiliary outlet to maintain a substantially constant pressure within the first mentioned means.

4. In a regenerative furnace having a furnace chamber and a regenerative unit, the combination of an auxiliary outlet, and means actuated by the pressure in the furnace chamber for controlling the flow of the products of combustion through the auxiliary outlet to maintain a substantially constant pressure within the regenerator unit.

5. In a regenerative furnace having a furnace chamber and a regenerative unit, the combination of an auxiliary outlet, means actuated by the pressure in the regenerative unit for controlling the flow of the products of combustion through the auxiliary outlet to maintain a substantially constant pressure within the regenerative unit, and a second means actuated by the pressure in the furnace chamber for controlling the total discharge from the regenerative unit and the auxiliary outlet to maintain a substantially constant pressure within the furnace chamber.

6. The method of exhausting the products of combustion from a regenerative furnace which comprises discharging through a regenerative unit and maintaining a constant pressure within said unit by regulating the discharge through an auxiliary outlet.

7. The method of exhausting the products of combustion from a furnace which comprises discharging the products of combustion at a substantially predetermined rate through a heat recovery apparatus by regulating the discharge through a second outlet to by-pass said heat recovery unit.

8. The method of operating a furnace which comprises exhausting the products of combustion at a predetermined pressure through a heat recovery apparatus by regulating the discharge through another outlet.

9. The method of maintaining a substantially constant discharge rate from a furnace chamber through a heat recovery unit which comprises controlling the discharge through a second outlet by the pressure of the waste gases acting on the heat recovery unit.

10. The method of maintaining a substantially constant discharge rate from a furnace chamber through a heat recovery unit which comprises controlling the discharge through a second outlet from the furnace chamber by the pressure in the furnace.

11. In a furnace having means comprising a furnace chamber and a heat recovery unit connected to the furnace chamber through one outlet, the combination of a second outlet, and means actuated by the pressure in the heat recovery unit for controlling the flow of products of combustion through said second outlet to maintain a substantially constant pressure within the first mentioned means.

12. In a furnace having a furnace chamber and a heat recovery unit connected to the furnace chamber through one outlet, the combination of an additional outlet for supplementing the heat recovery unit in exhausting the products of combustion from the furnace chamber, and means actuated by the pressure in the heat recovery unit for controlling the flow of the products of combustion through said additional outlet to maintain a substantially constant pressure within the heat recovery unit.

13. In a furnace, the combination of a furnace chamber, means for supplying fuel and air for firing said chamber and means defining a plurality of outlets for exhausting the products of combustion from said chamber, and means actuated by the pressure in the furnace chamber for maintaining a predetermined pressure of waste gases in one of said outlets by regulating the discharge in the other of said outlets.

14. In a furnace having a furnace chamber and a plurality of heat recovery means, the combination of a plurality of outlets leading to separate heat recovery means, and means actuated by the pressure in certain selected heat recovery means for maintaining a constant discharge rate through said selected heat recovery means by varying the rate of discharge through other of said outlets.

EMIL A. VIEROW.